Figure 1:
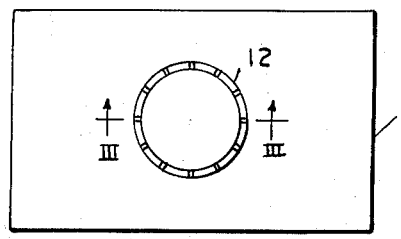

April 29, 1958 G. BARRADAS 2,832,515
SEALING UNIT

Filed Sept. 13, 1955 2 Sheets-Sheet 1

INVENTOR.
GEORGE BARRADAS.
BY
Holcombe, Wiseheart & Grisebois
ATTORNEYS

April 29, 1958     G. BARRADAS     2,832,515
SEALING UNIT
Filed Sept. 13, 1955     2 Sheets—Sheet 2
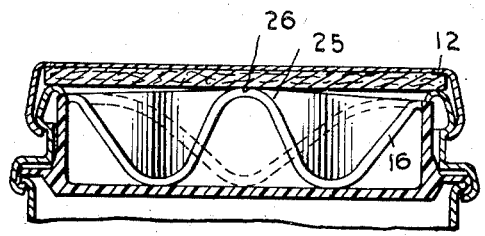
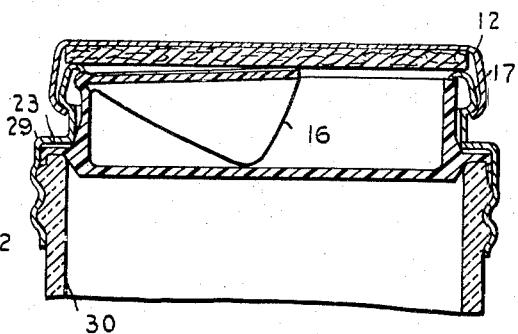
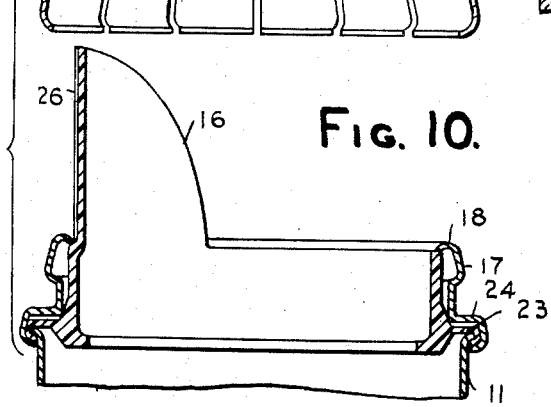
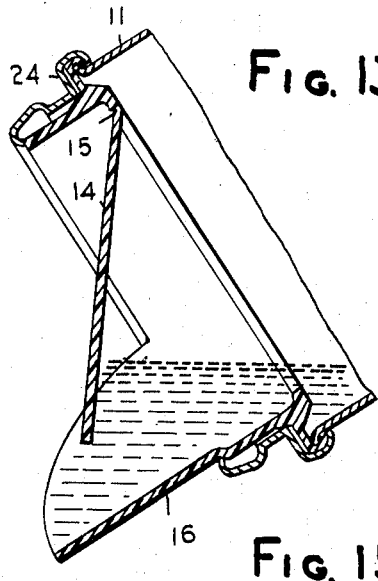
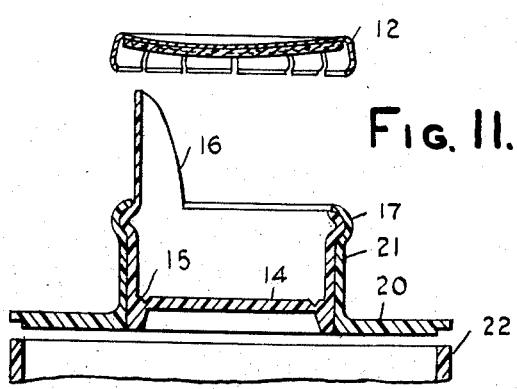
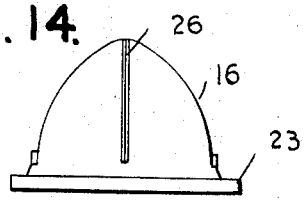
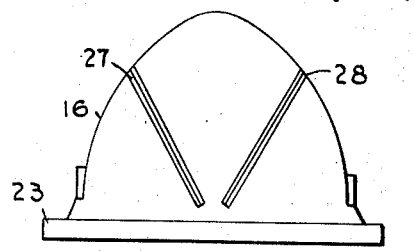
INVENTOR.
GEORGE BARRADAS.
BY
Holcombe, Wetherill & Brisebois
ATTORNEYS United States Patent Office
2,832,515
Patented Apr. 29, 1958

2,832,515
SEALING UNIT
George Barradas, Stamford, Conn.
Application September 13, 1955, Serial No. 533,974
10 Claims. (Cl. 222—529)

This invention relates to a means of closing and sealing containers, and more in particular it relates to a seal to be placed within the neck of a preformed container.

It is an object of this invention to form a mold a flexible seal that may be placed within the neck of a preformed container.

It is a further object of this invention to have molded thereon a spout to assist in emptying the contents of the container.

It is also an object of this invention to provide a foldable spout which will be retained within the neck of the receptacle until the cap is removed.

It is still another object of this invention to have a diaphragm or seal between the side walls, the side walls contacting the neck part of the container and the diaphragm so arranged that it may be wholly or partially removed from the side walls, and when so partially removed will act as a flutter valve to assist in retaining the contents of the container.

It is an additional object of this invention to place within the neck of the container a seal that in addition to retaining the contents thereof, will show any attempt to remove from the container any of its contents and will thereby form a "tamper-proof" seal.

Heretofore, it has been the practice to seal metal containers with corks, stoppers or "snap-on" fasteners, but these methods have not always given a liquid tight seal to the container. The improvement contemplated by this invention overcomes these difficulties.

This invention comprises preforming a flexible plastic unit that may be fitted into the neck of a container, and may be made to conform thereto in such a manner as to form a liquid tight seal with the sides of the container neck, which seal has a diaphragm or closure between the walls which may be severed by cutting or by other means to allow the removal of the contents.

Referring to the drawings, wherein two forms of the invention are illustrated, similar legend numbers designate similar parts.

Figure 2:
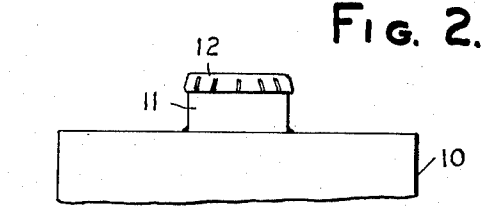
Figure 3:
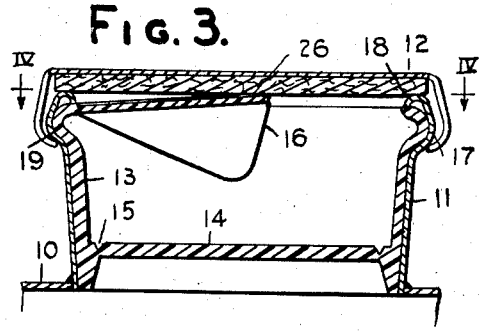
Figure 8:
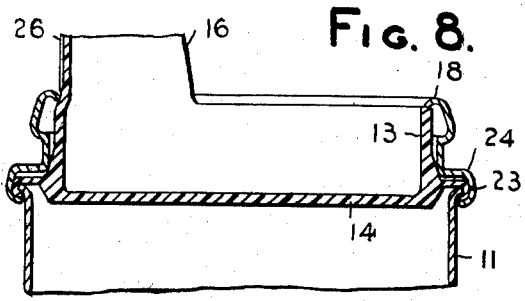
Figure 4:
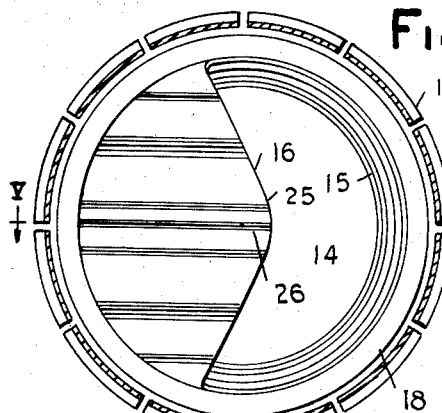
Figure 7:
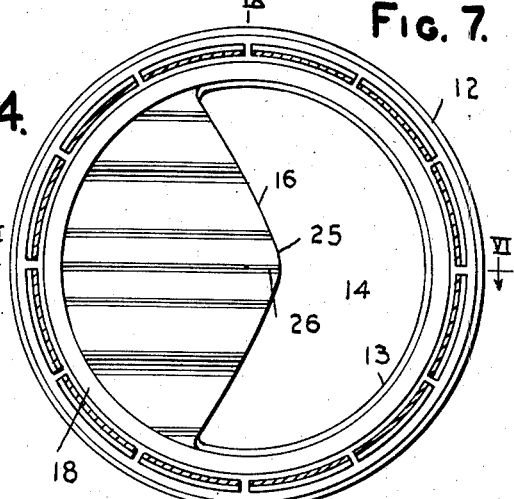
Figure 5:
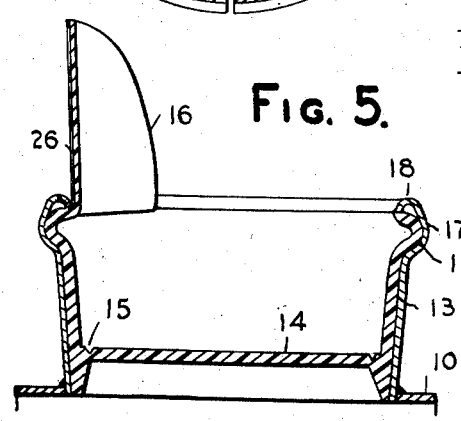
Figure 6:
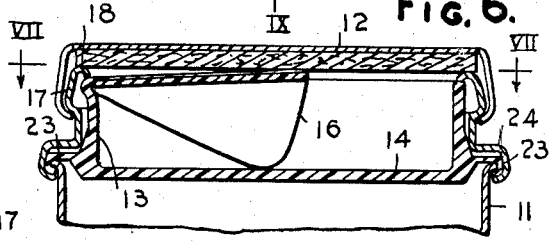

Figure 1 is a plan view of the top of the container.
Fig. 2 is a side view of the top of the container.
Fig. 3 is a sectional view on line 3—3 of Fig. 1.
Fig. 4 is a sectional view on line 4—4 of Fig. 3.
Fig. 5 is a sectional view on line 5—5 of Fig. 4 showing the spout in open position.
Fig. 6 is a sectional view on line 3—3 of Fig. 1, showing the second modification of this invention.
Fig. 7 is a sectional view on line 7—7 of Fig. 6.
Fig. 8 is a sectional view on line 7—7 of Fig. 6, showing the spout in open position.
Fig. 9 is a sectional view on line 9—9 of Fig. 7, showing the spout in the folded position.
Fig. 10 is a sectional view of Fig. 7, showing the cap removed when the spout is in open position.
Fig. 11 is a sectional view showing the first modification as applied to a plastic container.
Fig. 12 is a sectional view showing the application of the second modification as applied to a glass container.
Fig. 13 is a sectional view showing the second modification in a pouring position.
Fig. 14 is an end view of the spout showing the vertical groove.
Fig. 15 is a profile view of the spout showing two vertical grooves.

In the drawings, the container 10, shown in Figs. 1 and 2 has a neck portion 11 extending upwardly from the top surface thereof with a detachable cap closure 12 of the snap-on type mounted thereon.

The neck 11 has within it a seal 13, shown in Fig. 3. This seal has the side walls tapered to fit snugly within the neck 11 and has a diaphragm 14 molded in the bottom thereof. This diaphragm has a groove 15 around the bottom portion so as to form a weakened section more susceptible to tearing or cutting.

The diaphragm 14 is shown, for purposes of illustration, intermediate the top and the bottom of the side wall, but it may be placed at either end thereof.

The seal 13 is molded from a flexible plastic material, such as polyethylene, nylon, etc. This unit may have molded on the top thereof, the spout 16 which is of thinner material than the side walls and is retained in a collapsed position by the snap-on top 12, is shown in Figure 3.

A second modification of this invention is shown in Figures 6, 7 and 8, wherein the seal 13 has a projection 23 molded near the bottom thereof which fits over the top edge of the can neck 11, and has the bottom edge of the crown portion 24 crimped thereover so that the portion 23 of the seal acts as a washer between the upright part 11 of the neck and the part 24 which extends upwardly from the crimped section to receive the top part of the seal 13, to hold the bottom part of the cap 12. This is shown in section in Figure 6 with the cap holding the spout 16 in a folded position. If the cap is removed the spout assumes an erect position as shown in Figure 8, and when the seal 14 is cut away the contents can be poured from the can using this spout.

When the cap 12 is placed over the opening it causes the spout 16 to be folded downwardly in such a manner that it is creased, allowing the central portion 25 thereof to contact the underside of the cap. The spout then assumes the position shown in Figure 9, which is the section through Figure 6. In order to aid in this folding operation it has been found desirable to have a thin section 26 shown in Figure 14 and in Figures 8 and 9, or to have two thin sections 27 and 28, shown in Figure 15. These thin sections cause the spout to take the position shown in Figure 9, when folded and allow the spout to take position shown in Figure 10, when the cap 12 has been removed. The thin section 26 causes the spout to assume an upright position where it may aid in the pouring operation.

Whereas in the above description a spout is shown as being held in folded relation and the cap 12 is placed over the neck portion it is within the scope of this invention to have the spout so constructed that it will be folded either as shown at 16 in Figure 9 or will take the position shown by the dotted line. It is also within the scope of this invention to have the spout so designed that it will not fold when in a retracted position but will be forced up against the under side of the cap 12.

In use the seal is preformed by injection molding or a similar method and is made so as to fit the neck portions snugly. In the first modification illustrated in the drawings, the neck portion 11 is tapered and the seal 13 has its side wall so tapered as to conform thereto. This neck portion 11 has an expanded portion 17 near the top thereof with the rim 18, shown in Figs. 3 and 5, being returned inwardly to form a lip. This lip may be formed either before or after the seal is inserted. The seal 13 has the upper portion 19 thereof enlarged to fit within the expanded portion 17, or it may have a bead formed on the exterior surface thereof to fit within this expanded portion. The part 17 lies under the lip 18 which retains it forceably in position.

The neck portion may have the seal 13 inserted therein and then be assembled with the container, in which case the container will have to be filled through another opening, or the container may have the neck portion 11 assembled therein, the container filled and then the seal inserted.

A spout within the seal may be molded in similar manner, that is, the side walls without the diaphragm 14 having the spout 16 attached thereto may be molded and inserted in the neck of the container in the manner described above. The spout will aid in removing the contents.

It has been found desirable to have a protection in the form of a cap placed over the upper part of the neck portion. Such a cap 12 is shown in Figure 2.

When it is desired to remove the contents of the container, either in whole or in part, the cap 12 is removed. The spout 16 then assumes the position shown in Figure 5, the diaphragm being severed in part as shown in Figure 13, leaving a portion attached to the side walls opposite the spout. The contents of the can then flow past the seal which acts as a flutter valve. This valve assists in controlling the removal of the contents of the can when the container is placed in an upright position and the seal will assume its original position thereby forming a partial closure. The cap 12 may then be replaced with the spout 16 in the same position as shown in Figure 3, thereby allowing the container and its contents to be stored.

A seal of this type may be used in the neck portion of a plastic container, as shown in Figure 11, wherein the seal 13 is placed within the neck portion 21 of the container, which for purposes of illustration, rises above the top portion 20, which after filling may be heat sealed to the body portion 22. Whereas, this modification is illustrated in Figure 11 by means of a plastic container made in three parts. and whereas in the above description the plastic container is made in three parts it is of course within the scope of this invention to mold the top portion of the container onto the body portion so that the container will only be made in two parts, that is, the cap, the diaphragm and spout molded into the neck, and the neck portion as an integral part of the body portion.

It is also within the scope of this invention to form the spout with or without the seal, as an integral part of the neck portion of the container.

It is also within the scope of this invention to apply a seal such as that shown in the second modification and illustrated in Figures 14 and 15, to a glass container wherein a screw ring 29 shown in Figure 12, retains the portion 23 of the seal against the top edge of the glass jar 30 and holds the seal in position. The cap 12 may snap on over the expanded portion 17 of this retaining ring 29.

These seals are only removable by tearing or cutting after they have once been mounted within the neck of the container, and would therefore indicate any attempt to tamper with the container, such as an attempt to remove a portion of the contents of the container.

While the above description deals primarily with a combination diaphragm and spout it is of course within the scope of this invention to have the spout without the diaphragm which may be inserted within the neck portion as described; or the combination of the diaphragm, or the spout alone may be inserted in the opening as shown in Figure 10 without any neck portion being necessary.

As can be readily seen this type of seal is of particular advantage in the transportation of materials such as gasoline, turpentine, petroleum ether, etc., materials that have a high vapor pressure which would normally allow the vapor to escape from the closures heretofore used.

In the description of this invention here presented, only two modifications are shown, but it may be readily apparent to one skilled in the art that many modifications come within the scope of this disclosure.

This application is a continuation-in-part of application Serial No. 480,701, filed January 10, 1955, now abandoned.

What is claimed is:

1. A container having a neck thereon, with an expanded upper portion, the edge being crimped inwardly, a seal inserted within said neck, said seal comprising side walls having the upper portion to fit within and be immovably held in place by said expanded portion of said neck, a severable closure intermediate the ends of the side wall having a thin section between two thick sections.

2. A container having a neck thereon, with an expanded upper portion, the edge being crimped inwardly, a polyethylene seal inserted within said neck, said seal comprising side walls having the upper portion expanded to fit within and be immovably held in place by said expanded portion of said neck, a severable closure intermediate the ends of the side wall having a thin section between two thick sections.

3. A tamper-proof container having a neck portion thereon with an expanded upper portion, a seal inserted within said neck portion, said seal comprising side walls having an upper portion expanded to fit and be immovably held in place by said expanded portion of said neck, a severable closure intermediate the ends of the side walls having a thin section between two thick sections.

4. A container having a neck thereon with an expanded upper portion, the edge being crimped inwardly, an insert in said neck comprising side walls having a normally erect spout portion attached to the upper part thereof restrainedly collapsible into said neck to allow a closure thereon.

5. A container having a neck thereon with a crown portion fastened over the neck, a seal inserted within said neck having a severable closure intermediate the ends thereof and a flange immovably held between said neck and said crown portion.

6. A container having a neck thereon with a crown portion fastened over the neck, a seal inserted within said neck having a severable closure immovably intermediate the ends thereof and a flange held between said neck and said crown portion, a spout portion attached integral with the seal walls restrainedly collapsible into said neck.

7. A container having a neck thereon with a crown portion fastened over the neck, a seal inserted within said neck having a severable closure intermediate the ends thereof and a flange held between said neck and said crown portion, a spout portion integral with the seal walls having at least one thin section lengthwise of the spout and collapsible into said neck.

8. A container having a neck thereon with an expanded portion, a seal inserted within said neck portion, said seal comprising side walls having an upper portion expanded to fit and be held in place by said expanded portion of said neck, and a severable closure intermediate the ends of said walls, a spout portion integral with said seal walls having at least one thin section lengthwise of the spout and foldable into said neck.

9. A container having a neck thereon with an expanded portion, a seal inserted within said neck portion, said seal comprising side walls having an upper portion expanded to fit and be held in place by said expanded portion of said neck, and a severable immovable closure intermediate the ends of said walls, a spout portion integral with the seal walls having a thin section lengthwise of the spout, and retainedly foldable into said neck.

10. A glass container having a ring retaining means removably fastened to the top thereof, a seal having side walls and a bottom portion intermediate the ends of said side walls, a flange from said seal extending over the top of the glass container being held in position by said ring, a spout portion integral with the seal walls having at least one thin section lengthwise of the spout and restrainedly collapsible into said neck.

References Cited in the file of this patent

UNITED STATES PATENTS

| | | |
|---|---|---|
| 2,072,756 | Kosa | Mar. 2, 1937 |
| 2,543,470 | Ryan | Feb. 27, 1951 |
| 2,561,596 | Reike | July 24, 1951 |
| 2,661,128 | Reike | Dec. 1, 1953 |
| 2,690,861 | Tupper | Oct. 5, 1954 |
| 2,723,060 | Reike | Nov. 8, 1955 |

FOREIGN PATENTS

| | | |
|---|---|---|
| 467,044 | Canada | Aug. 1, 1950 |